Aug. 16, 1938.    L. J. MOST    2,127,043

METHOD OF DECORATING PLASTIC ARTICLES

Filed March 25, 1936    3 Sheets-Sheet 1

Lucifer J. Most,
Inventor,
Delos G. Haynes,
Attorney.

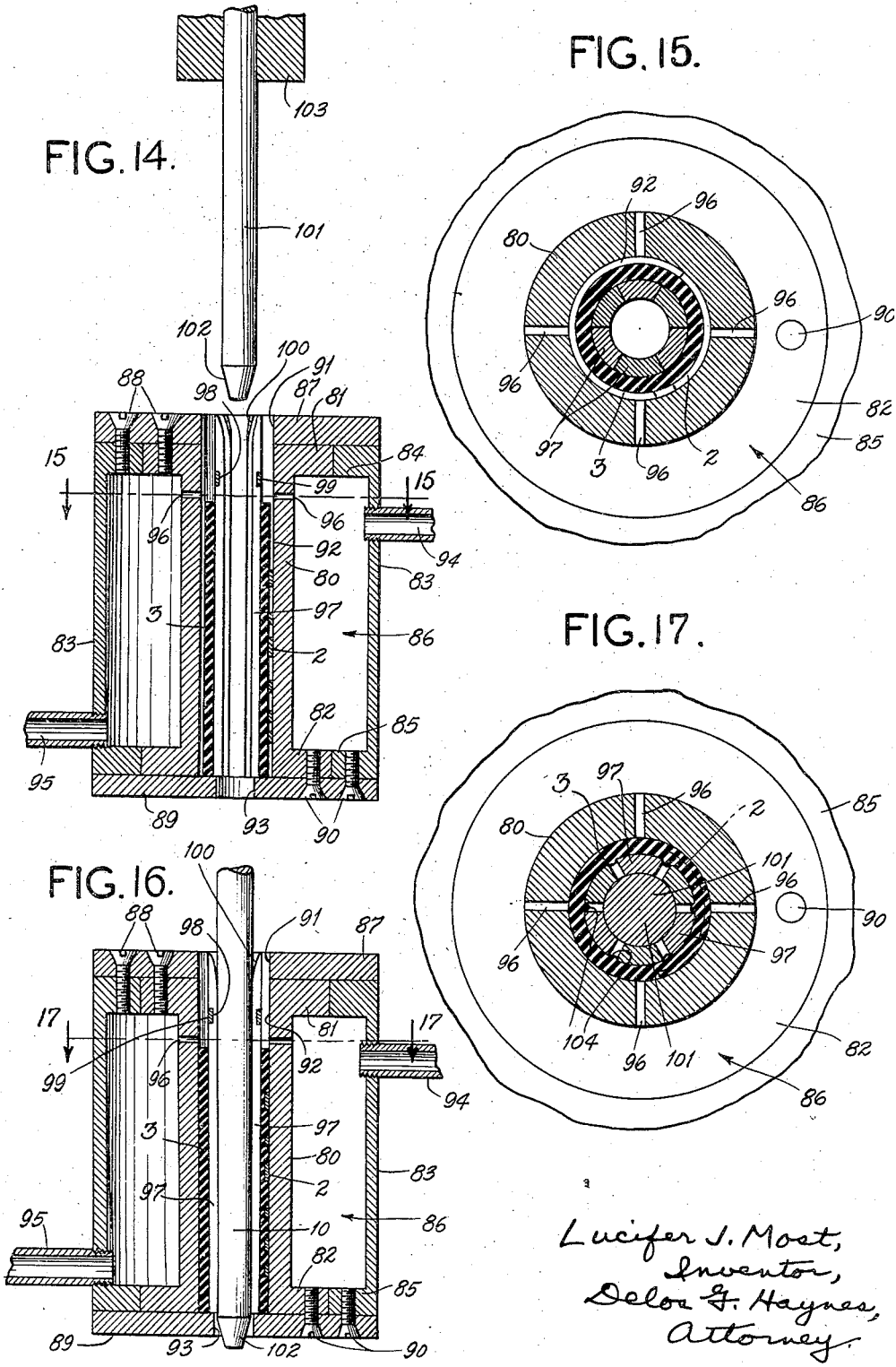

Aug. 16, 1938.  L. J. MOST  2,127,043
METHOD OF DECORATING PLASTIC ARTICLES
Filed March 25, 1936  3 Sheets-Sheet 3
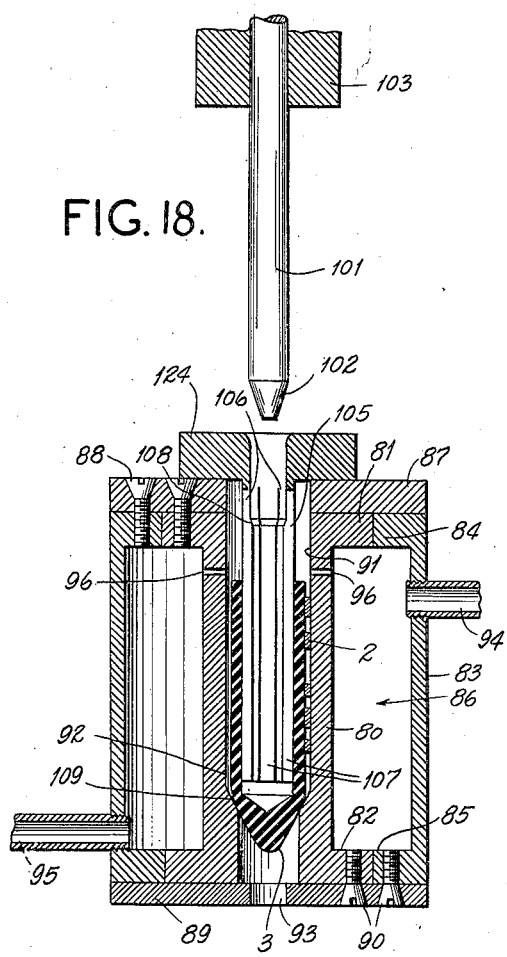
FIG. 18.
FIG. 19.
FIG. 20.
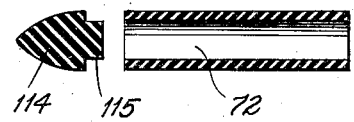
Lucifer J. Most,
Inventor,
Delos F. Haynes,
Attorney.

Patented Aug. 16, 1938

2,127,043

UNITED STATES PATENT OFFICE 2,127,043

METHOD OF DECORATING PLASTIC ARTICLES

Lucifer J. Most, Arlington, N. J., assignor, by mesne assignments, to Metals & Controls Corporation, Attleboro, Mass., a corporation of Massachusetts Application March 25, 1936, Serial No. 70,811

3 Claims. (Cl. 18—59)

This invention relates to molded articles, and with regard to certain more specific features, to decorated molded articles, and methods of manufacturing the same.

Among the several objects of the invention may be noted the provision of methods of manufacturing molded articles, such as fountain pen holders, having decorated areas or regions therein of a different material, such decorations being of the nature of inlay work; the provision of a method of manufacturing decorated molded articles of the class described in which the decorative pieces are embedded in the molded article in such a manner that they will not readily come free therefrom; the provision of a method of the class described which may be carried out with maximum simplicity, and with a minimum of special apparatus and the like; and the provision of a method of manufacturing molded articles, which is economical. Other objects will be in part obvious and in part pointed out hereinafter.

The invention accordingly comprises the elements and combinations of elements, steps and sequence of steps, features of construction and arrangements of parts, which will be exemplified in the methods hereinafter described, and the scope of the application of which will be indicated in the following claims.

In the accompanying drawings, in which are illustrated several of various possible embodiments of the invention, Fig. 1 is a side elevation of a molded article, comprising a fountain pen cap, made in accordance with the method of the present invention;

Fig. 14 is an axial section of a mold;

Fig. 15 is a cross-section taken substantially along line 15—15 of Fig. 14;

Fig. 16 is a section similar to Fig. 14, illustrating the mold of Fig. 14 at the completion of a molding operation;

Fig. 17 is a cross-section taken substantially along line 17—17 of Fig. 16;

Fig. 18 is a section similar to Fig. 14, showing another alternative mold;

Fig. 19 is a side elevation of an extractor; and,

Fig. 20 is a longitudinal section of a built-up blank.

Similar reference characters indicate corresponding parts throughout the several views of the drawings.

It has been found desirable in several parts to provide molded plastic articles, such as fountain pen holders, including both the barrel and the cap, with decorative surfaces comprising metallic or other pieces which are so inlaid into the plastic article as to form a substantially continuous surface therewith. Heretofore most of this decoration has been done by routing the finished plastic article, and then inlaying into the routed groove the desired decorative elements, and securing them either through the use of an adhesive or by some mechanical means. Obviously, as the design of the decorative piece becomes more complicated, as in the case of filigree decorations, the routing operation becomes highly complicated and requires a great deal of time and effort. For this practical reason, decoration by inlaying the decorative pieces into routed grooves on plastic articles has heretofore been confined to comparatively simple designs.

However, it will readily be seen that more complicated designs of decorative pieces are frequently desirable. For example, in Fig. 1 there is shown the tubular part of a fountain pen cap 1, which may be molded from any of the commonly utilized plastic materials, such as pyroxylin plastics. The decorative piece in this instance comprises a sheet of metal cut into the form of a signature, as indicated by numeral 2. Obviously, in order to route and inlay such a decorative element, a great deal of careful work would be needed on the cap 1.

Figure 1:
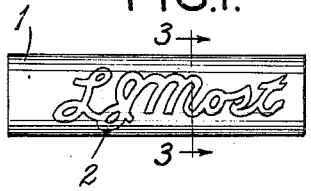
Figure 2:
Fig. 2 is a developed view of the decorative element of the Fig. 1 article.

Fig. 2 shows the decorative element of the Fig. 1 article, before it is inlaid in said article. It will be seen that it comprises a metal sheet cut to the required shape. Before attaching it to the cap 1, it is formed to the required cylindrical contour. The material of the decorative element is usually metal, and frequently a precious metal such as gold plate, although it will be understood that the material of which the decorative element 2 is composed is of little consequence to the present invention.

Figure 3:
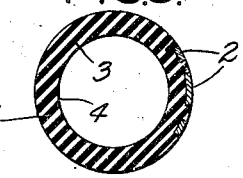
Fig. 3 is a cross-section taken substantially along line 3—3 of Fig. 1.

It is desired that in the finished, decorated article, the decorative element 2 will be positioned in such a manner that its surface is substantially co-extensive or flush or even with the surface of the fountain pen cap 1. This arrangement is indicated in Fig. 3. In Fig. 3, it will be seen that the decorative element 2 is embedded in the article, and is retained there at least in part by the adhesion of the plastic material of the article, the adhesive bond having been established by the plastic material when in its softened condition.

Figure 12:
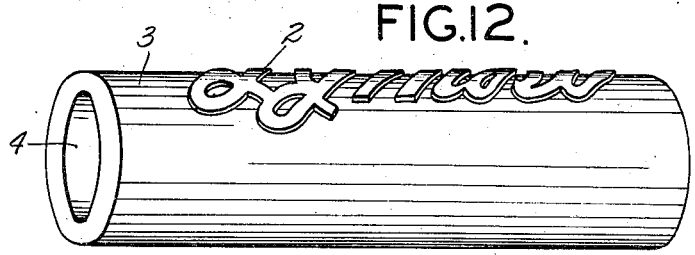
Fig. 12 is a perspective view illustrating an early stage in manufacturing the article of Fig. 1.

The article of Fig. 1 may be made, carrying out the method of the present invention in the following manner:

Referring now more particularly to Fig. 12, numeral 3 indicates a blank which is in the nature of a rod of plastic material having an exterior cylindrical surface, and a cylindrical opening 4 drilled therein from end to end.

The blank 3 is made of whatever plastic material, such as a pyroxylin plastic, from which it is desired that the finished article be made. The exterior cylindrical surface and the interior cylindrical hole 4 are both preferably formed accurately, and on the same axis.

As an initial step, the flat design element 2, shown in Fig. 2, is formed, as by stamping, etching, engraving or bending, to fit accurately against the exterior cylindrical surface of the blank 3. It is then placed in its desired final position on said blank 3, and held in position preferably with the aid of a cement or adhesive composition. The cement or adhesive need not be of permanent nature, as it forms but a temporary securing means for the design element 2.

The blank 3 with the decorative element 2 secured thereon, all as shown in Fig. 12, is now placed in the cavity 92 of a mold such as the one shown in Figures 14, 15, 16 and 17.

Referring to Fig. 14, numeral 80 indicates a cylinder having outwardly extending flanges 81 and 82 at its ends. Numeral 83 indicates a concentric cylinder of greater diameter, which has inwardly extending flanges 84 and 85 at its ends, the flanges 84 and 85 abutting the flanges 81 and 82. There is thus provided an annular chamber 86. The cylinders 80 and 83 are held in assembly by a top plate 87, held by studs 88 to the flanges 81 and 84, and a bottom plate 89, held by studs 90 to the flanges 82 and 85. The top plate 87 has a central opening 91 in line with the central opening or cavity 92 of the cylinder 80, while the bottom plate 89 has a similar opening 93 of smaller diameter than the opening 92. The cylinder 83 has an inlet pipe 94 and an outlet pipe 95 therein, communicating with the chamber 86. The inlet pipe 94 is desirably provided with a two-way valved connection so that either hot or cold fluid may be admitted to the chamber 86. Passages 96 are preferably provided to connect the chamber 86 and the molding cavity 92.

Numeral 97 (see also Fig. 15) indicates a plurality of collet-like segmental sections (six in the present embodiment) which when nested together form an expansible hollow cylinder that readily slips into a tubular blank 3. A circular slot 98 around the outer peripheries of the upper end of the segmental group permits the insertion of a spring 99, which tends to hold the segments together in hollow cylindrical assembly. The upper ends of the inner faces of the segments forming the cylindrical assembly are outwardly tapered, as indicated at numeral 100.

Numeral 101 indicates an oversized solid cylindrical plunger or mandrel tapered at one end 102. The plunger 101 slides in a fixed-position block 103, which is hereinafter referred to as a stripper block.

In using this mold, a tubular blank 3, with whatever decorative element is to be used, attached thereto, is slipped into the cavity 92, preferably from the top, until it abuts the plate 89. The expansible hollow cylinder of segments 97 is then slipped into position inside the blank 3, the plate 89 serving to properly position said segments. The blank 3 is then softened by heating the mold by admitting, say, steam, into the chamber 86 through inlet pipe 94. Some steam finds its way through passages 96 to the molding cavity 92, and thus aids in heating the blank 3.

The blank 3 may, under some conditions, preferably be pre-softened by heating it prior to the time that it is inserted in the mold. However, under most circumstances, the entire heating and softening of the blank 3 takes place within the mold.

When the blank 3 is suitably softened, the tapered end 102 of the oversized plunger 101 is inserted into the tapered end 100 of the expansible hollow cylinder assembly, and the plunger 101 is then driven the length of said assembly, until it projects through the hole 93 (see Fig. 16). The plunger moves the elements 97 radially outwardly, expanding the softened blank 3 until it contacts the walls of the cavity 92, and thereby embedding the decorative element in the blank as in prior embodiments.

The plate 89 prevents the material of the blank 3 from flowing longitudinally, and holds the blank 3 and collection of segments 97 in proper position relative to each other, throughout the molding step.

After the plunger 101 has reached its Fig. 16 position, thereby laterally expanding the segments 97, the mold is cooled by admitting a cold fluid to the chamber 86 through inlet 94, to set the expanded blank. Thereafter, the plunger 101 is withdrawn upwardly from the mold. It usually carries the segments 97 and molded blank 3 with it, but these are slid off the plunger by engaging the stripping block 103.

During the molding by this method, small quantities of the material of the blank 3 may be forced into the spaces between adjacent segments 97 to form radial fins 104 (Fig. 17), which may later be easily removed from the molded article as by reaming.

Fig. 18 illustrates a variation of the mechanical expansion method of Fig. 14. The mold of this embodiment is substantially identical to the mold of Fig. 14, but the expanding element has been changed. In place of a spring-retained assembly of loose segments, there is now provided a block 124 having a depending cylinder 105 adapted to fit into a blank (which may, in this embodiment, be a closed-end blank). Longitudinal slots 106 relieve fingers 107 from the cylinder 105, the fingers 107 functioning as the segments 97 in Fig. 18. An inward taper 108 is provided for the fingers 107, so that the oversized plunger 101 when inserted therein will move them radially outwardly.

An inward taper 109 in the central molding cavity 92 of the mold provides an abutment for the blank 3 and prevents it from slipping downwardly as the plunger 101 is inserted. The movement of the plunger, in this embodiment, is limited so that it will not engage the closed end of the blank 3.

Expansion is carried out with this embodiment in the same manner as that set forth in connection with Fig. 14.

The time, pressure, and temperature conditions for expansion of any particular plastic material blank depends upon the composition and characteristics of the material of the blank. If the blank comprises a semi-cured pyroxylin material, for example, any hot fluid not a solvent for pyroxylin may be used for softening it. On the other hand, if totally cured pyroxylin is used, (and this is ordinarily preferred) it may sometimes need to be softened by soaking it for several days in a solvent, such as a twenty per cent. solution of methyl acetone, before it is made pliable in a hot, non-solvent fluid, although such softening is not ordinarily necessary. Other plastic materials may have similar steps to be performed thereon before they can be softened.

Figure 4:
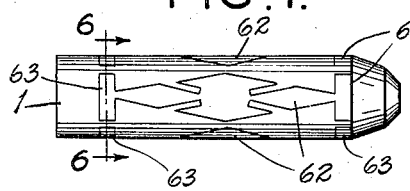
Fig. 4 is a side elevation of an article similar to the article of Fig. 1, showing alternative decorations.

The decorative element of the article shown in Fig. 1 is but one form of numerous decorative elements that can be used within the scope of the invention. For example, in Fig. 4 is shown a series of decorative elements 62, which are located in repeated positions around the periphery of a closed-end article, as distinguished from the tube of Fig. 1. Each decorative element 62, as shown in the developed position in Fig. 5, comprises thin sheet material, such as metal, which is provided with parallel end bands 63. In the finished article, the end bands 63 of adjacent elements 62 are positioned closely together, so that they appear to be substantially a continuous band extending around the periphery of the article.

Figure 13:
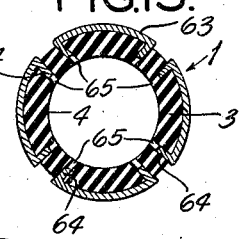
Fig. 13 is a cross-section, similar in some respects to Fig. 6, but showing the article of Fig. 4 at an early stage in its manufacture.

The adhesive method heretofore described may successfully be used for attaching the decorative element 62 to the blank of the article. However, an alternative method is shown in these figures. Each end of each band 63, as well as certain portions in the central portion of the element, is provided with a bendable dove-tail tab or projection portion 64. Referring to Fig. 13, it will be seen that the blank 3 is provided with radial holes 65 suitably positioned to receive, in relatively tight frictional engagements, the bent tabs 64 of the decorative element 62. This engagement of the tabs 64 in the fold 65 forms the temporary means of holding the decorative element 62 in position. The tabs 64 it will be noted, need not extend, in the Fig. 13 position, all the way to the inside wall 4 of the blank 3.

Proceeding in this manner, a mold of the type illustrated in Fig. 18 and heretofore described is also preferably used, although other methods of expansion can be used with success.

Figure 6:
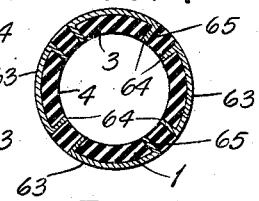
Fig. 6 is a cross-section taken substantially on line 6—6 of Fig. 4.

In the course of expansion of the blank 3 of the Fig. 13 embodiment, whatever openings or leaks associated with the holes 65 are present, are closed by the flow of the plastic material. Thus, in its finished form, as shown in Fig. 6, the decorated article has the decorative element 62 solidly captured or imbedded therein, without any objectionable openings. It will be noted from Fig. 6 that the ends of the tabs 64 are now substantially flush with the inner wall 4 of the article, because of the expansion of the article in the course of its manufacture. The outer surface of the article is coextensive or flush with the surface of the decorative element 62, as desired. The dove-tail shape of the tabs 64 secures them in position in locked manner.

Figure 5:
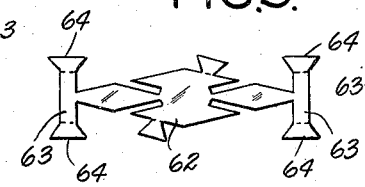
Fig. 5 is a developed view of a decorative element of the Fig. 4 article.
Figure 7:
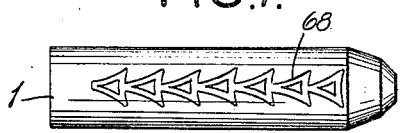
Fig. 7 is a side elevation of an article similar to the article of Fig. 1, showing further alternative decorations.
Figure 8:
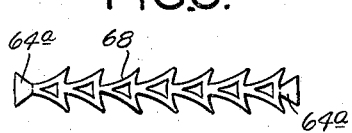
Fig. 8 is a developed view of a decorative element of the Fig. 7 article.

Figures 7 and 8 illustrate a decorated article, and the decorative element thereof, which are in many respects similar to the embodiments of Figures 4 and 5. In this embodiment, however, the decorative element, indicated by numeral 68, is but a single longitudinal piece, lacking in the elements 63 which in the article of Fig. 4 appear to encircle the article. Tabs 64a, however, are provided, and these tabs 64a are used for attaching the decorative element 68 to the blank 3 in the same manner described in connection with Figures 5 and 13.

Expansion of this embodiment is preferably carried out with the apparatus of Fig. 14, in the same manner as that described in connection with Fig. 4, although other expansion methods can be used.

Figure 11:
Fig. 11 is a cross-section taken substantially on line 11—11 of Fig. 9.
Figure 9:
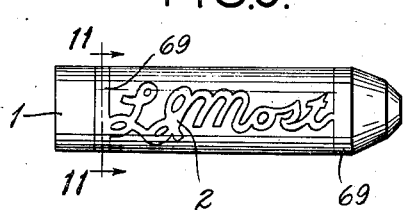
Fig. 9 is a side elevation of an article similar to the article of Fig. 1, showing still further alternative decorations.
Figure 10:
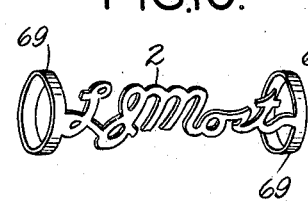
Fig. 10 is a perspective view of a decorative element of the Fig. 9 embodiment.

Figures 9, 10, and 11 illustrate still another embodiment of the invention, and are for the purpose of showing still another method of attaching the decorative element to the blank prior to expansion. In this embodiment, the decorative element 2, which has been given the same signature form as the decorative element shown in the Fig. 1 embodiment, is provided at each of its ends with an encircling band 69. The bands 69 may be seamless, in which event the decorative element is cut from a suitable piece of tubing, or they may comprise flat strips bent into cylindrical shape with abutting ends. The latter is usually preferable, as the decorative element may more readily be cut from a sheet of flat stock than from a tube. Or, the decorative element 2 may be cut from a sheet of flat stock, and the bands 69 cut from tubular stock and welded or soldered to the ends of the element 2.

The decorative element in this instance is made of a suitable diameter to slide relatively tightly onto the exterior of the blank 3. It is preferably positioned on the blank 3 in this manner and is retained there by friction. The blank is then positioned in the mold of Fig. 14, if tubular, or the mold of Fig. 18, if closed at its end and expanded in the manner described.

As an alternative in connection with this embodiment, the decorative element may be positioned in the mold first, and the blank 3 then inserted into the mold into a position within the decorative element. The blank 3 may be softened prior to this insertion, or may be softened entirely within the mold, as heretofore described.

Fig. 19 shows a device which may be used to extract shaped blanks from the molds in several embodiments of the invention, should the blanks become stuck in the molds. It comprises a rod 112 having conical cutting threads 113 at its end. It is similar to so-called "bolt removers" available in the market. It is used by inserting the end 113 in the open end of a stuck blank, rotating the device enough for the threads 113 to secure a slight "bite" into the blank, and then withdrawing the device, and with it the blank.

Fig. 20 shows how a cap 114 may be inserted and cemented, along a shoulder 115, to the end of a tubular blank 3, to make it into a closed-end article. The cap 114 may be applied either before or after any of the molding operations described.

Although all of the embodiments shown in the drawings disclose articles of cylindrical shape, prismatic or pyramidal or conical shapes or a combination of any or all of these, may be made, as the outer appearance of the finished article depends almost entirely upon the shape of the molding cavity used for that article.

In all embodiments of the invention, it is usually preferable to subject the decorated article, after its removal from the mold, to a series of finishing and polishing operations, to remove any fins, (such as the fins 104 in Fig. 17), and to remove any portions of plastic material that have erroneously flowed or expanded into a position overlaying a decorative element.

While the invention as so far described has been concerned with the molding of individual articles, it will readily be seen that a length suitable for a plurality of decorated articles, may be used by extending the lengths of the mold and the blank, positioning the decorative elements at suitable intervals therealong, expanding the entire length in one operation, and then cutting the length so expanded to the individual tube lengths.

In view of the above, it will be seen that the several objects of the invention are achieved and other advantageous results attained.

As many changes could be made in carrying out the above constructions and methods without departing from the scope of the invention, it is intended that all matter contained in the above description or shown in the accompanying drawings shall be interpreted as illustrative and not in a limiting sense.

I claim:

1. The method of decorating plastic articles which comprises providing a mold having a cavity of the shape of the finished article, providing a hollow blank of plastic material smaller than said cavity, positioning the blank in the cavity, and providing at least one decorative element in position to be embedded in the blank, heating the blank to soften it, inserting a rigid expansible hollow cylindrical member of smaller diameter than the internal diameter of the blank into the center of said blank, and driving a plunger larger in diameter than the inside diameter of the expansible member into the expansible member to expand said member radially, while holding said blank against longitudinal movement relative both to said cavity and to said expansible member, thereby forcing said blank radially against the walls of the cavity, thereby embedding the decorative element in the blank, and thereafter allowing the blank to become rigid and removing it from the mold.

2. The method of decorating plastic articles which comprises providing a mold having a cavity of the shape of the finished article, providing a hollow blank of plastic material smaller than said cavity, providing a decorative element having an exterior surface shaped to conform to the desired exterior surface of the finished article, said decorative element also having anchoring means extending into preformed substantially radial recesses in the tubular blank, positioning the blank in the cavity, with the decorative element between the blank and the walls of the cavity, and the anchoring means in position in said recesses, heating the blank to soften it, inserting a rigid expansible hollow cylindrical member of smaller diameter than the internal diameter of the blank into the center of said blank, and driving a plunger larger in diameter than the inside diameter of the expansible member into the expansible member to expand said member radially while holding said blank against longitudinal movement relative both to said cavity and to said expansible member, thereby forcing said blank radially against the walls of the cavity, thereby embedding the decorative element in the blank with its exterior surface coextensive with the exterior surface of the expanded blank, and thereafter allowing the blank to become rigid and removing it from the mold.

3. The method of decorating plastic articles which comprises providing a mold having a cavity of the shape of the finished article, providing a hollow blank of plastic material smaller than said cavity, positioning the blank in the cavity, and providing at least one decorative element in position to be embedded in the blank, said decorative element being of such character that it does not completely encircle said blank, heating the blank to soften it, inserting a rigid expansible hollow cylindrical member of smaller diameter than the internal diameter of the blank into the center of said blank, and driving a plunger larger in diameter than the inside diameter of the expansible member into the expansible member to expand said member radially while holding said blank against longitudinal movement relative both to said cavity and to said expansible member, thereby forcing said blank radially against the walls of the cavity, thereby embedding the decorative element in the blank, and thereafter allowing the blank to become rigid and removing it from the mold.

LUCIFER J. MOST.